(12) United States Patent
van der Lely et al.

(10) Patent No.: US 6,237,530 B1
(45) Date of Patent: May 29, 2001

(54) IMPLEMENT FOR AUTOMATICALLY MILKING ANIMALS, SUCH AS COWS

(75) Inventors: Alexander van der Lely, Jan Witkampstraat; Karel van den Berg, Boterbloemstraat; Franciscus J. A. de Groen, Kookwitje; Willen A. F. van der Weele, Zügerstrasse, all of (NL)

(73) Assignee: Maasland N.V. a Dutch Limited Liability co., Maasland (NL)

( * ) Notice: Subject to any disclaimer, the term of this patent is extended or adjusted under 35 U.S.C. 154(b) by 0 days.

(21) Appl. No.: 09/566,127

(22) Filed: May 5, 2000

Related U.S. Application Data

(63) Continuation of application No. PCT/NL99/00550, filed on Sep. 3, 1999.

(30) Foreign Application Priority Data

Sep. 14, 1998 (NL) .................................... 1010074
Mar. 23, 2000 (WO) ........................... WO 00/15029

(51) Int. Cl.[7] .......................................... A01J 5/00
(52) U.S. Cl. ............................................. 119/14.08
(58) Field of Search ........................ 119/14.01, 14.02, 119/14.03, 14.08

(56) References Cited

U.S. PATENT DOCUMENTS

| | | | |
|---|---|---|---|
| 2,472,122 | * 6/1949 | Polivka | 119/14.03 |
| 2,512,094 | * 6/1950 | Duncan | 119/14.03 |
| 2,617,383 | * 11/1952 | Duncan | 119/14.03 |
| 2,742,876 | * 4/1956 | Duncan | 119/14.03 |
| 3,059,616 | * 10/1962 | Cline | 119/14.03 |
| 3,168,888 | * 2/1965 | Brodrick | 119/14.03 |

\* cited by examiner

Primary Examiner—Thomas Price
(74) Attorney, Agent, or Firm—Penrose Lucas Albright

(57) ABSTRACT

An apparatus for automatically milking animals, such as cows, comprising automatic milking machine and a milking robot for automatically connecting teat cups to the teats of an animal to be milked. The apparatus is further provided an enclosure having a control room which is accessible to and contains at least part of the milking machine and milking robot. The apparatus further comprises a device for cleaning or disinfecting, or both, an operator who enters the control room. This is accomplished automatically by providing adjacent to, or as part of, the door that enters the control room, a cleaning and disinfecting device which at least contacts the footwear of an operator entering the control room. The door may be turnable about a centrally disposed vertical axis which rotates to provide an entrance and exit from the control room, the bottom of the rotatable door comprising a basin which contains cleaning or disinfectant fluid or both. The enclosure may have one or two milking compartments either side by side or aligned longitudinally, a control room with access to the milking robot or robots and milking machine or machines and a cleaning and disinfecting device adjacent to, or as part of, the entry door and, as a whole, the enclosure may be movable.

19 Claims, 3 Drawing Sheets

# IMPLEMENT FOR AUTOMATICALLY MILKING ANIMALS, SUCH AS COWS

RELATED APPLICATION

This is a Continuation Application of Application No. PCT/NL99/00550, filed Sep. 3, 1999.

FIELD OF THE INVENTION

The invention relates to an apparatus for automatically milking animals, such as cows, comprising an automatic milking machine and a milking robot for automatically connecting teat cups to the teats of an animal to be milked, the apparatus further being provided with a control room in which at least part of the milking machine or milking robot, or both, are arranged temporarily or permanently.

BACKGROUND OF THE INVENTION

With such apparatus, hygiene is very important. This is particularly so when an operator or a mechanic touches or handles part of the apparatus including the milking machine and milking robot, whereby unless prevented, milk present therein may be contaminated.

Therefore, an object of the invention is to provide an apparatus which operates in a very hygienic manner.

SUMMARY OF THE INVENTION

In accordance with the invention, hygienical operations of the apparatus are achieved by providing it with cleaning or disinfecting means or both with the aid of which an operator is cleaned or disinfected or both preferably automatically before coming into contact with part of the milking machine or the milking robot or both in the control room.

According to a further inventive feature, the cleaning or disinfecting means or both are arranged near an entrance door of the control room. In this manner the operator is cleaned or disinfected or both immediately before, during or immediately after entering the control room. According to another embodiment of the invention, the cleaning or disinfecting means or both are arranged in the control room.

In accordance with again another inventive feature, the cleaning or disinfecting means or both comprise a hygienic gateway. According to a further embodiment of the invention, the cleaning or disinfecting means or both comprise a swing door, the cleaning or disinfecting means or both being arranged on, in or near the swing door. In a preferred embodiment of the invention, the cleaning or disinfecting means or both comprise a basin to be waded through, which basin is filled with a cleaning or disinfecting liquid or a disinfecting mat for disinfecting the shoes of an operator.

According to another aspect of the invention, the cleaning or disinfecting means or both comprise a mechanical device for cleaning or disinfecting shoes or boots. According to a further aspect of the invention, the mechanical cleaning or disinfecting device or both comprise brushes or a spraying device or both.

According to again another embodiment of the invention, the cleaning or disinfecting device or both comprise a radiation source with the aid of which disinfecting radiation, such as UVC-light, is transmitted.

In accordance with an inventive feature, the cleaning or disinfecting device or both comprise a blowing device for cleaning or drying or both the clothes or the shoes or both of the operator.

According to again another aspect of the invention, the cleaning or disinfecting means or both comprise a high-pressure sprayer or an automatically operable cock.

In accordance with a preferred embodiment of the invention, the above described apparatus is designed as a container which is preferably movable.

The invention further relates to a swing door, provided with cleaning or disinfecting means or both, which swing door can be applied in an apparatus as described above. According to a further inventive feature, the swing door comprises sensor means with the aid of which the swing door automatically commences to operate when an operator approaches same.

BRIEF DESCRIPTION OF THE DRAWINGS

The invention will now be explained in further detail with reference to the accompanying drawings.

DETAILED DESCRIPTION OF THE PREFERRED EMBODIMENTS

Figure 1:
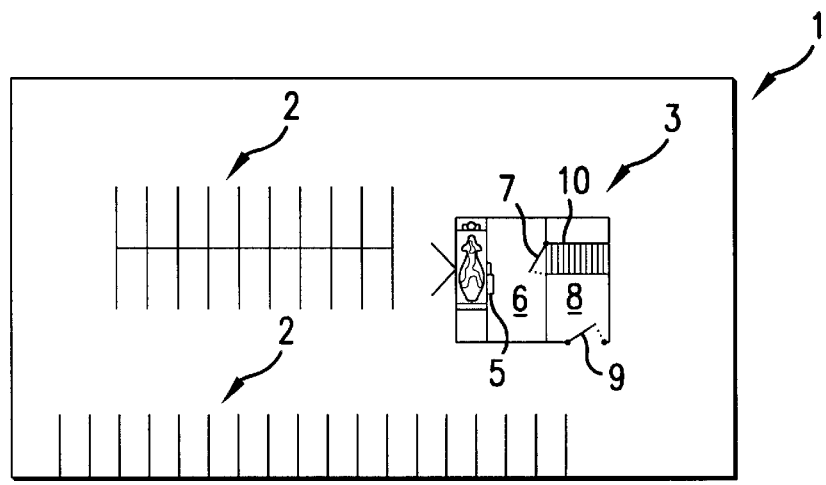
FIG. 1 is a plan view of a first embodiment of the invention, in which the control room with the cleaning or disinfecting means or both together with the milking robot and the milking machine accommodated therein are arranged in the middle of the shed.

FIG. 1 is a plan view of a shed 1 with a number of cubicles 2, in which shed an apparatus 3 for automatically milking animals is arranged. Apparatus 3 for automatically milking animals comprises a milking compartment 4 with a milking robot 5 which includes an automatic milking machine disposed therein. Apparatus 3 is further provided with a control room 6 surrounded by walls. Control room 6 provides entrance to at least part of milking robot 5 and at least part of the milking machine. Control room 6 is provided with an entrance door 7. It is possible to enter entrance door 7 via a hygienic gateway 8. In the present embodiment hygienic gateway 8 is designed as an extra room surrounded by walls and provided with an entrance door 9. In hygienic gateway 8, near entrance door 7 to control room 6, there is disposed a basin 10 to be waded through, which basin is filled with cleaning or disinfecting liquid or both. Basin 10 to be waded through is disposed over the full width of hygienic gateway 8. In an alternative embodiment, it is further possible to replace basin 10 to be waded through by a disinfecting mat. In again another embodiment of the invention, it is further possible to dispose a bench over the full width of the control room, while at one side of the bench the operator leaves his or her contaminated clothes or shoes or both and puts on clean clothes and shoes at the other side of the bench before entering the control room.

Figure 2:
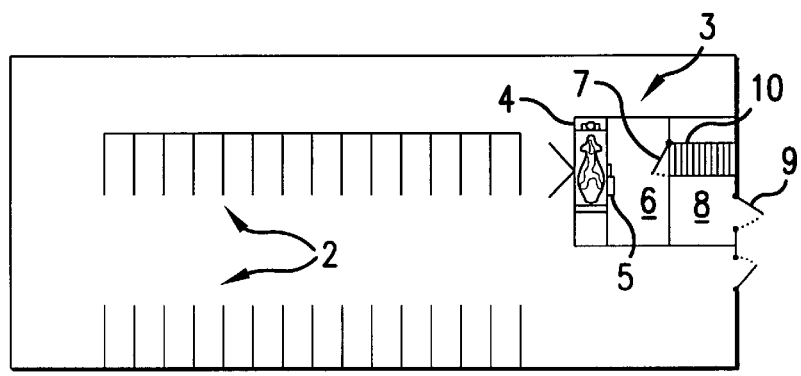
FIG. 2 is a plan view of a second embodiment of the invention, in which the control room with the cleaning or disinfecting means or both with the milking robot and the milking machine accommodated therein are arranged near a side wall of the shed.

FIG. 2 shows a second embodiment of the invention, in which the parts of apparatus 3 corresponding to those of the first embodiment are indicated by the same reference numerals. Apparatus 3 according to the second embodiment only differs in that the apparatus is arranged near a side wall of the shed 1.

Figure 3:
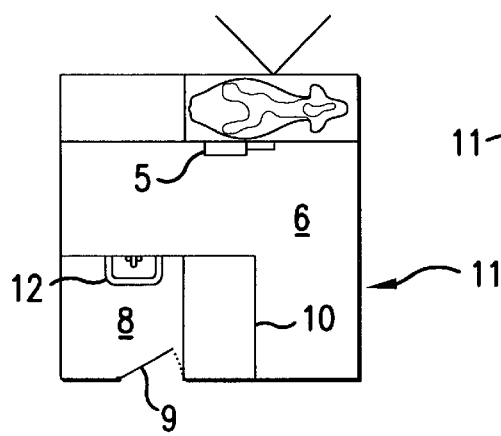
FIG. 3 is a plan view of a third embodiment of the invention, in which the apparatus is designed as a container.

FIG. 3 is a plan view of a third embodiment of the invention, in which apparatus 3 is designed as a possibly movable container 11. In this embodiment, corresponding parts are also indicated by the same reference numerals. In hygienic gateway 8 there is further disposed a cock or valve 12 which can be automatically put into and out of operation.

Figure 4:
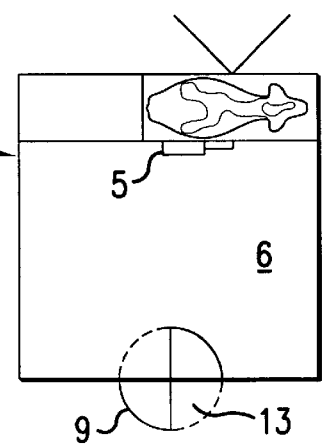
FIG. 4 is a plan view of a fourth embodiment of the invention, in which the apparatus is also designed as a container and in which a swing door construction with cleaning or disinfecting means or both included therein is shown as an entrance door to the control room.

FIG. 4 shows a fourth embodiment of the invention, in which apparatus 3 is also constituted by a container 11, but in which entrance door 9 to control room 6 is designed as a swing door and in which the lower side of the swing door comprises a basin 13 which can be filled with the cleaning or disinfecting liquid or both.

Figure 5:
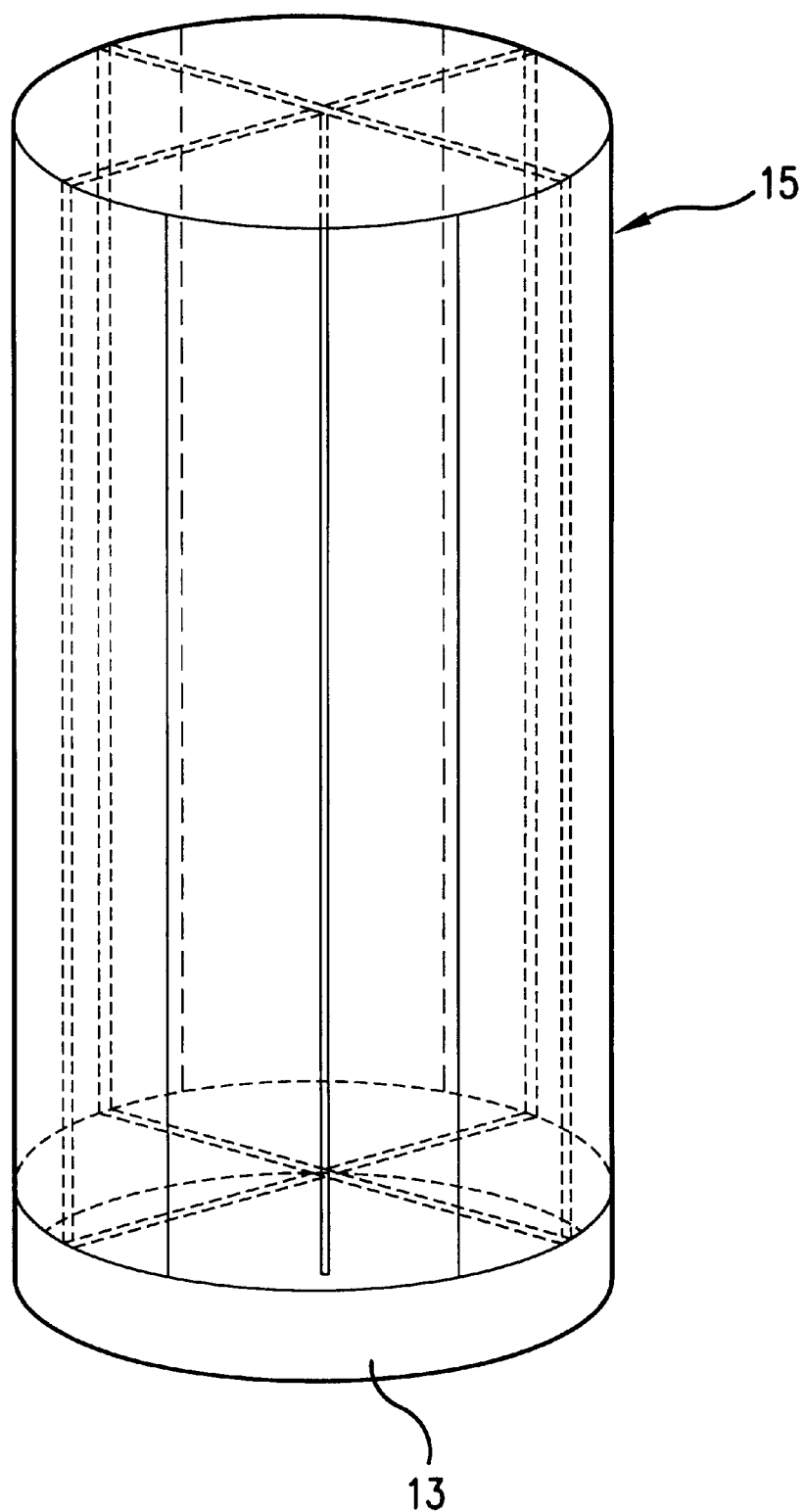
FIG. 5 is an isometric side view of a swing door construction with cleaning or disinfecting means or both included therein.

FIG. 5 shows a non-integrated swing door construction 15 which, near its lower side, is provided with a basin 13 which can be filled with cleaning or disinfecting liquid or both. An already existing entrance door to the control room can easily be replaced by swing door construction 15 which is provided with cleaning or disinfecting means or both.

Figure 6:
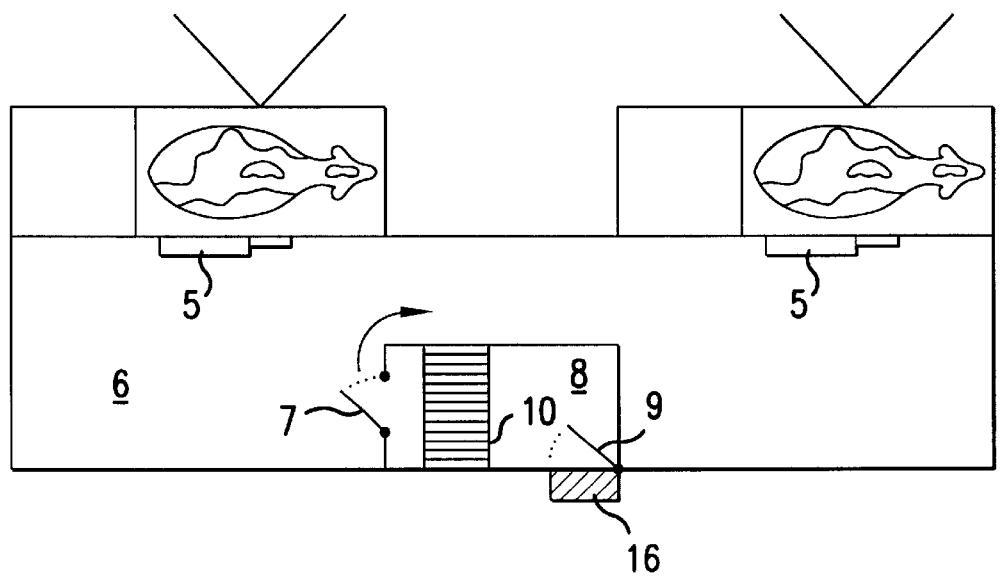
FIG. 6 shows a fifth embodiment of the invention, in which the apparatus is provided with two milking robots and a hygienic gateway is arranged near the entrance door to the control room.
Figure 7:
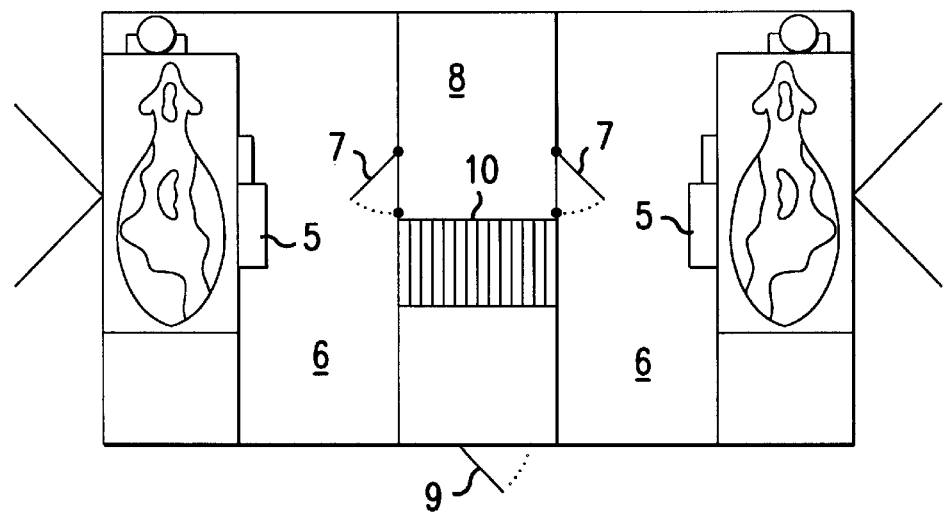
FIG. 7 is a plan view of a sixth embodiment of the invention, in which the apparatus is also provided with two milking robots and the hygienic gateway is arranged between the robots.

FIGS. 6 and 7 are plan views of fifth and sixth embodiments, respectively, of the invention, in which apparatus 3 is provided with two milking robots 5. In the embodiment according to FIG. 6, milking robots 5 are aligned so that one is disposed behind the other and for the two milking robots 5, there is one control room 6 which can be reached via one hygienic gateway 8. Near entrance door 9 of hygienic gateway 8 there is further provided a blowing device 16 by means of which the clothes or shoes or both of an operator entering the hygienic gateway 8 are cleaned by blowing. Both in FIG. 6 and in FIG. 7 corresponding parts are indicated by the same reference numerals as in previous figures. In the embodiment of FIG. 7 the two milking robots 5 are arranged side by side, whereas hygienic gateway 8 is disposed between the two milking robots 5. It is possible to enter the two control rooms 6 from hygienic gateway 8 via separate entrance doors 7.

Although we have disclosed the preferred embodiments of our invention, it is to be understood that it is capable of other adaptations and modifications within the scope of the following claims:

Having disclosed our invention, what we claim as new and to be secured by Letters Patent of the United States of America is:

1. An apparatus for automatically milking animals comprising an automatic milking machine and a milking robot for automatically connecting teat cups to the teats of an animal to be milked, the apparatus further being provided with a control room which contains said milking machine and said milking robot and comprising cleaning and disinfecting means with the aid of which an operator is automatically cleaned and disinfected before coming into contact with said milking machine said milking robot in said control room.

2. An apparatus in accordance with claim 1, wherein said cleaning and disinfecting means is arranged near an entrance door of the control room (6).

3. An apparatus in accordance with claim 1, wherein said cleaning and disinfecting means is contained in said control room.

4. An apparatus in accordance with claim 1, wherein said cleaning and disinfecting means comprises a hygienic gateway into said control room.

5. An apparatus in accordance with claim 1, comprising a swing door which functions as an entry and exit to said control room, said cleaning and disinfecting means being arranged in said swing door.

6. An apparatus in accordance with claim 1, wherein said cleaning and disinfecting means comprises a basin disposed in said control room which contains a cleaning and disinfecting fluid to be waded through by an operator who enters said control room.

7. An apparatus in accordance with claim 1, wherein said cleaning and disinfecting means comprises a disinfecting mat disposed in said control room for receiving the footwear of an operator entering said control room.

8. An apparatus in accordance with claim 1, wherein said cleaning and disinfecting means comprises a mechanical device for disinfecting footwear which is worn by an operator while in said control room.

9. An apparatus in accordance with claim 8, wherein said mechanical device comprises a brush.

10. An apparatus in accordance with claim 8, wherein said mechanical device comprises a spraying device.

11. An apparatus in accordance with claim 1, wherein said cleaning and disinfecting means comprises a radiation source which transmits a disinfecting radiation.

12. An apparatus in accordance with claim 11, wherein said disinfecting radiation comprises ultraviolet light radiation.

13. An apparatus in accordance with claim 1, wherein said cleaning and disinfecting means comprises a blowing device.

14. An apparatus in accordance with claim 1, wherein said cleaning and disinfecting means comprises a high-pressure spraying device.

15. An apparatus in accordance with claim 1, wherein said cleaning and disinfecting means comprises an automatically operable valve.

16. An apparatus in accordance with claim 1, wherein said control room comprises a movable container.

17. An apparatus in accordance with claim 1, wherein said control room comprises a swing door for entering and exiting said control room.

18. An apparatus in accordance with claim 17, comprising sensor means for automatically opening said swing door when an operator approaches said swing door.

19. An apparatus for automatically milking animals which comprises a movable enclosure, said enclosure containing a milking compartment which includes an automatic milking machine and a milking robot for automatically connecting teat cups to the teats of an animal to be milked in said milking compartment; entry and exit means for animals to enter into and exit from said milking compartment; a control room adjacent said milking compartment for providing access of an operator to said automatic milking machine and said milking robot; a door spaced from said milking compartment for an operator to enter into and exit from said control room; and a cleaning and disinfecting means at said door for destroying micro-organisms and removing contaminants carried by persons including the apparel which they are wearing who enter said control room.

\* \* \* \* \*